United States Patent [19]

Crowther et al.

[11] Patent Number: 4,629,599
[45] Date of Patent: Dec. 16, 1986

[54] BURNABLE ABSORBER ARRANGEMENT FOR FUEL BUNDLE

[75] Inventors: Russell L. Crowther, Saratoga; Dennis B. Townsend, San Jose, both of Calif.

[73] Assignee: General Electric Company, San Jose, Calif.

[21] Appl. No.: 799,333

[22] Filed: Nov. 18, 1985

Related U.S. Application Data

[63] Continuation of Ser. No. 619,499, Jun. 11, 1984, abandoned, which is a continuation of Ser. No. 360,389, Mar. 22, 1982, abandoned.

[51] Int. Cl.⁴ .................................................. G21C 7/04
[52] U.S. Cl. ...................................... 376/212; 376/349; 376/419; 376/428; 376/435
[58] Field of Search ............... 376/428, 435, 419, 263, 376/917, 212, 349, 370

[56] References Cited

U.S. PATENT DOCUMENTS 3,799,839  3/1974  Fischer et al. ................... 376/435 X

FOREIGN PATENT DOCUMENTS

94183  7/1980  Japan .................................. 376/428

*Primary Examiner*—Harold J. Tudor
*Assistant Examiner*—John S. Maples
*Attorney, Agent, or Firm*—Ivor J. James, Jr.; Raymond G. Simkins

[57] ABSTRACT

A reactor fuel assembly (15) configuration which allows cold shutdown margins to be met with minimal penalty to operating efficiency. The assembly comprises a component of fissile material distributed over a substantial axial extent of the fuel assembly and a component of neutron absorbing material having an axial distribution characterized by an enhancement in a relatively short axial zone (65) (the "cold shutdown control zone") corresponding to at least a portion of the axial region of cold shutdown maximum reactivity. The axial distribution of the component of neutron absorbing material typically is characterized by an additional enhancement in an axial zone (62) (the "hot operating control zone"). The component of neutron absorbing material is conveniently incorporated into at least some of the fuel rods (57-G1, G2, G3, G4). The enhancement in the cold shutdown control zone may be provided at least in part by one or more fuel rods (G2, G3) having absorber only in the cold shutdown control zone. The enhancement of the neutron absorbing material in the cold shutdown control zone may be supplemented by reduced fuel enrichment in the cold shutdown control zone.

17 Claims, 22 Drawing Figures

BURNABLE ABSORBER ARRANGEMENT FOR FUEL BUNDLE

CROSS REFERENCE TO RELATED APPLICATION

This is a continuation of application Ser. No. 619,499 filed June 11, 1984, now abandoned which was a continuation of application Ser. No. 360,389 filed Mar. 22, 1982, now abandoned.

FIELD OF THE INVENTION

The present invention relates generally to nuclear reactors, and more specifically to a fuel bundle arrangement for a boiling water reactor.

BACKGROUND OF THE INVENTION

In a nuclear reactor, a fissile fuel atom, such as U-235, absorbs a neutron in its nucleus and undergoes a nuclear disintegration which produces on the average two fission fragments of lower atomic weight with great kinetic energy and several neutrons also at high energy.

In a typical boiling water reactor (BWR), the nuclear fuel is in the form of fuel rods, each of which comprises a plurality of sintered pellets contained within an elongated cladding tube. Groups of such fuel rods are supported between upper and lower tie plates to form separately replaceable fuel assemblies or bundles. A sufficient number of such fuel assemblies are arranged in a matrix, approximating a right circular cylinder, to form the nuclear reactor core which is capable of self-sustained fission reaction. The kinetic energy of the fission products is dissipated as heat in the fuel rods. Energy is also deposited in the fuel structure and moderator by the neutrons, gamma rays, and other radiation resulting from the fission process. The core is submerged in coolant (for example, water) which removes the heat which may then be extracted to perform useful work. Where the coolant is water, it also acts as a neutron moderator, which slows down the neutrons to render them more likely to initiate a fission reaction.

The commonly used fuel for water cooled and moderated nuclear power reactors comprises uranium dioxide of which from about 0.7 to about 5.0 percent is fissile U-235 mixed with fertile U-238. During operation of the reactor, some of the fertile U-238 is converted to fissile Pu-239 and Pu-241. The U-238 also is fissile, but only for high energy neutrons. The ratio of fissile material produced (for example, Pu-239 and Pu-241) to fissile material destroyed (for example, U-235, Pu-239, and Pu-241) is defined to be the "conversion ratio."

If the reactor is to operate at a steady state power level, the fission-inducing neutron population must remain constant. That is, each fission reaction must produce a net of one neutron which produces a subsequent fission reaction so that the operation is self-sustaining. The operation is characterized by an effective multiplication factor $k_{eff}$ which must be at unity for steady state operation. It is noted that the effective multiplication factor $k_{eff}$ is the neutron reproduction factor of the nuclear reactor considered as a whole, and is to be distinguished from the local or infinite multiplication factor $k_{inf}$ which defines the neutron reproduction of an infinitely large system having throughout the same composition and characteristics as the local region of the reactor core in question.

During operation, the fissile fuel is depleted, and indeed, some of the fission products are themselves neutron absorbers or "poisons." To offset this, the reactor is normally provided with an initial excess of nuclear fuel which results in initial excess reactivity. This initial excess reactivity requires a control system to maintain the effective multiplication factor at unity during reactor operations and to reduce the effective multiplication factor to below unity in the event that it is necessary to shut down the reactor. The control system typically utilizes neutron absorbing material which serves to control the neutron population by non-fission absorption or capture of neutrons.

At least a portion of the neutron absorbing material is incorporated in a plurality of selectively actuatable control rods which are axially inserted from the bottom of the core as required to adjust the power level and distribution and to shut down the core. Burnable absorbers may be incorporated into some of the fuel rods to minimize the amount of mechanical control required. A burnable absorber is a neutron absorber which is converted by neutron absorption into a material of lesser neutron absorbing capability. A well-known burnable absorber is gadolinium, normally in the form of gadolinia. The odd isotopes (Gd-155 and Gd-157) have very high capture cross sections for thermal neutrons. The burnable absorbers available for use in design have an undesirable end-of-refueling cycle neutron absorption reactivity residual due to residual isotopic neutron absorption by small neutron cross section absorbers. For example, if gadolinium is used as a burnable absorber, the high cross section isotopes (Gd-155 and Gd-157) deplete rapidly but residual absorption remains due to continued neutron capture in the even isotopes (Gd-154, Gd-156, and Gd-158).

As is well known, burnable absorbers such as gadolinium operate in a self-shielded mode when present at sufficient concentration. That is, upon exposure to the neutron flux, the neutron absorption occurs essentially at the outer surface of the absorber so that the volume of absorber shrinks radially at a rate that depends on the concentration of absorber. It is then possible, by a suitable choice of the number of absorber-containing regions and the absorber concentrations therein, to provide a desired variation of the absorption worth over one or more reactor operating cycles.

During operation, the percentage of steam voids increases towards the top of the reactor, leading to decreased moderation in the top regions, and thus a power distribution that is skewed toward the lower regions of the core. It is a known practice to compensate for this by distributing burnable absorber in an axially inhomogeneous manner. A number of fuel rods are provided with burnable absorber having a distribution skewed toward the axial region of hot operating maximum reactivity. A typical configuration is shown in U.S. Pat. No. 3,799,839.

However, the situation is very different in the cold shutdown state. More particularly, in the cold state, the top of an irradiated BWR core is more reactive than the bottom due to greater plutonium production and less U-235 destruction in the top during operation (greater conversion ratio and smaller burnup in the top of the core). In the cold shutdown condition, the steam voids in the upper part of the core are eliminated, thus making the top of the core more reactive than the bottom. Typical licensing standards require a 0.38% reactivity shutdown margin ($k_{eff}$ less than 0.9962) with any one control rod stuck out of the core. To provide margin for prediction uncertainties, a design basis of 1% predicted shutdown margin ($k_{eff}$ less than 0.99), to be provided by the control rods and the burnable absorbers, typically is used.

While axial power shaping may be carried out by providing greater amounts of burnable absorber in the lower portions of the reactor core, the optimum absorber shape for full power axial power shape optimization does not lend itself to maintaining adequate cold shutdown margin. In order to meet cold shutdown constraints, it is typically necessary to design with excess burnable absorber residual which penalizes the initial enrichment and uranium ore requirements and increases the fuel cycle cost of the reactor.

A further problem is that gadolinia reduces the thermal conductivity of the fuel rods and increases fission gas release. Consequently, the gadolinia-containing rods are frequently the most limiting rods in the fuel assembly, and have to be down-rated in power with a correspondingly adverse effect on local power distributions. The amount of power down-rating that is required depends on the gadolinia concentration, but becomes a serious problem in extended burnup fuel bundle designs and/or high energy cycle designs where increased gadolinia concentrations are required in order to provide adequate cold shutdown margins.

Thus, the margins required for the hot operating and cold shutdown conditions place competing constraints on the reactor core design, and have thus tended to prevent the achievement of an optimal core configuration.

SUMMARY OF THE INVENTION

The present invention is drawn to a reactor fuel assembly configuration which allows cold shutdown margins to be met with minimal penalty to operating efficiency. The configuration minimizes end-of-cycle reactivity residual in burnable absorbers, minimizes initial enrichment requirements, makes use of greater concentration burnable absorbers more feasible and optimal, and maximizes flexibility in burnable absorber distribution for axial power shape control.

Broadly, the foregoing benefits are achieved by providing a fuel assembly which comprises, in addition to a component of fissile material distributed over a substantial axial extent of the fuel assembly, a component of neutron absorbing material having an axial distribution characterized by an enhancement in a relatively short axial zone (designated the "cold shutdown control zone") corresponding to at least a portion of the axial region of cold shutdown maximum reactivity (where the neutron flux peaks in the cold shutdown condition). To this end, the fuel assembly is configured with greater concentration or a greater number of transversely distributed regions containing burnable absorber in the cold shutdown control zone. The cold shutdown control zone permits reduction of burnable absorber in other regions at the top and middle of the core. This allows a reduction of the overall burnable absorber content of the fuel assembly and facilitates optimization of the burnable absorber distribution. By "component of fissile material" is meant herein the fissile material in all of the fuel rods of the fuel assembly. For example, the aggregate amount of fissile material at any axial location in the fuel assembly is the total of the fissile material content of all of the fuel rods at that axial location. Similarly, by "component of neutron absorbing" material is meant herein the neutron absorbing material in all of the absorber containing rods or elements in the fuel bundle. For example, the aggregate amount of absorbing material at any axial location in the fuel assembly is the total of the absorbing material content of all of the absorber containing rods or elements at that axial location.

The axial distribution of the component of neutron absorbing material typically includes portions extending over most or all of the axial extent of the fissile material to accomplish axial power shaping, typically being characterized by an additional enhancement in an axial zone corresponding to at least a portion of the axial region of hot operating maximum reactivity. This latter zone, designated the "hot operating control zone" is typically longer than the cold shutdown control zone and is located near the bottom of the fuel assembly.

The component of neutron absorbing material is conveniently incorporated into at least some of the fuel rods. The enhancement in the cold shutdown control zone may be provided at least in part by one or more fuel rods having absorber only in the cold shutdown control zone. Where gadolinia is used, the concentration of gadolinia in these rods may be higher than in the other gadolinia-containing fuel rods since the total internal gas pressure contribution of the short, high concentration gadolinia segments is small.

It can be seen that by configuring the fuel assembly with the highest concentration and the highest number of burnable absorber regions in the cold shutdown control zone, the cold shutdown worth of the burnable absorber is maximized. At the same time, this absorber enhancement is in the reduced neutron importance region of the core at hot operating conditions, and thus has minimum impact on the axial power distributions in the hot operating state. Additionally, the gadolinia residual absorptivity penalty of the cold reactivity zone is minimal hot but maximal cold. This has the effect of minimizing adverse fuel cycle effects.

The fuel rods having only the short gadolinia segment in the cold shutdown control zone may be located in lattice positions normally forbidden to gadolinia, for example, diagonally adjacent to corner rods of the fuel assembly, without having adverse effect on in-core instrument interpretation and without requiring enrichment reduction in these fuel rods to accommodate fission gas release caused by the gadolinia.

According to a further aspect of the present invention, the enhancement of the neutron absorbing material in the cold shutdown control zone may be supplemented by reduced fuel enrichment in the cold shutdown control zone. The reduced enrichment may be confined to the gadolinia-containing fuel rods, thereby simplifying fuel manufacturing. Reducing enrichment in the cold shutdown control zone makes more efficient use of neutrons than increasing the gadolinia content in this zone. Fissile inventory requirements to achieve a given design burnup are reduced. The reactivity decrease due to reduced enrichment prevails throughout fuel assembly residence whereas burnable absorbers decrease reactivity primarily during the first refueling cycle of residence. However, for a fixed peak enrichment, reducing the enrichment in the cold shutdown control zone reduces burnup and aggravates axial power peaking more severely than increasing gadolinia in this zone. Therefore it is advantageous to utilize a combination of enrichment and enhanced gadolinia content.

For a further understanding of the nature and advantages of the present invention, reference should be made to the remaining portions of the specification and to the attached drawings.

DESCRIPTION OF THE PREFERRED EMBODIMENT

Figure 1:
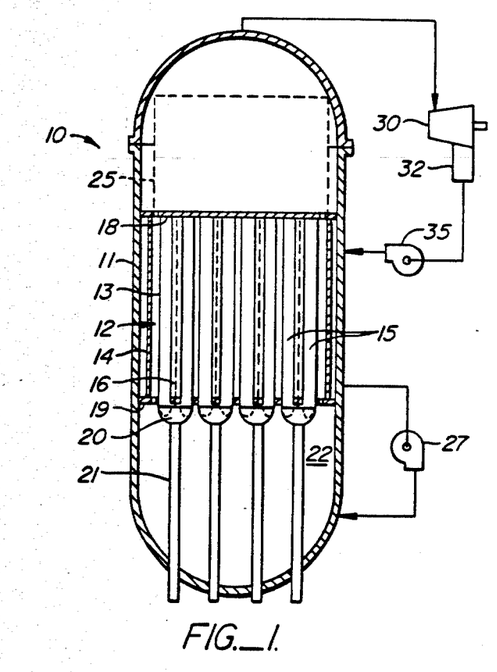
FIG. 1 is a schematic illustration of a water cooled and moderated nuclear reactor.
Figure 2:
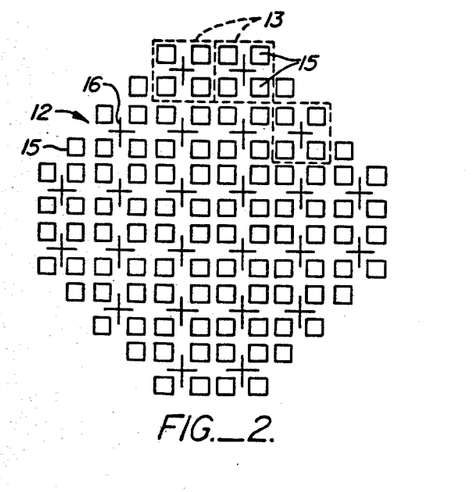
FIG. 2 is a schematic plan view illustrating the general layout of the reactor fuel core.

FIG. 1 is a partly cut away side elevational view drawn in schematic form, illustrating a water cooled and moderated nuclear reactor system 10 of the boiling water type. The system includes a pressure vessel 11 within which is situated a reactor core 12 submerged in a coolant-moderator such as light water. Core 12 comprises a plurality of fuel cells 13 surrounded by an annular shroud 14. Each fuel cell includes four fuel assemblies (or bundles) 15 and a control rod 16. The fuel cells are held in spaced relation to one another by an upper core grid 18 and a lower core plate 19, and are supported at their respective bottoms by appropriate supports 20. The control rods may be selectively insertable among the fuel assemblies for control of the core reactivity. Associated with each control rod is a control rod guide tube 21 that guides the control rod when it is withdrawn below the core. FIG. 2 is a schematic top plan view illustrating the manner in which fuel cells 13 are arranged within core 12. It should be understood that a typical core would contain on the order of 300-900 fuel assemblies.

The portion of pressure vessel 11 below core 12 defines a coolant supply chamber 22 while the portion above the core includes a steam separator-drier arrangement 25. In operation, a coolant circulation pump 27 pressurizes the coolant in coolant supply chamber 22, forcing it upwardly through core 12. The coolant absorbs heat generated by the fission reaction occurring within the core and part of the coolant is converted to steam which passes through separator-drier arrangment 25 to a utilization device such as a turbine 30. A condenser 32 in line with the turbine condenses the exhaust steam and the condensate is returned as feedwater by a condensate return pump 35 to the input side of coolant circulation pump 27.

Figure 3:
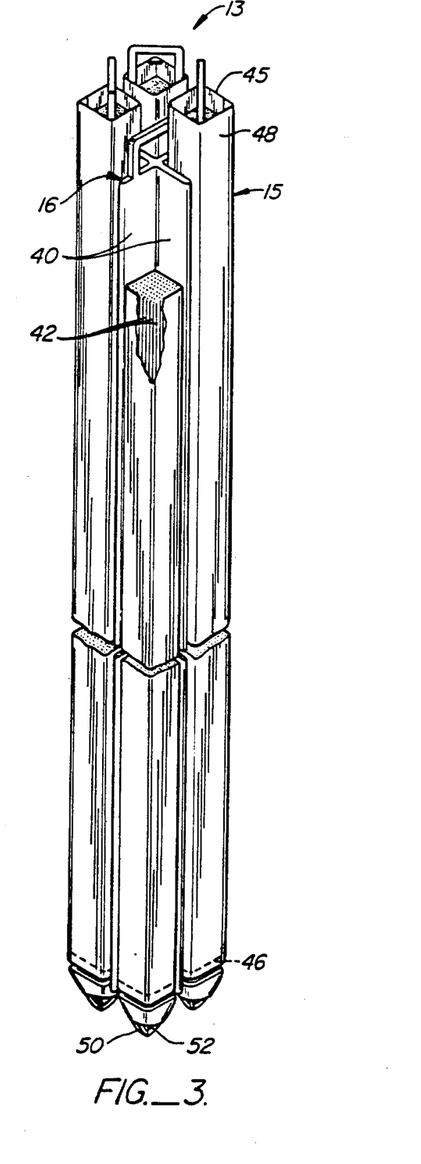
FIG. 3 is a simplified, partly cut away isometric view of one of the fuel cells in the core.

Referring to FIG. 3, the structure of one of fuel cells 13 may be seen. Control rod 16 has a transverse cruciform profile to define control blades 40, each of which is interposed between two adjacent fuel assemblies. Each fuel assembly 15 comprises a plurality of elongate fuel rods 42 held between upper and lower tie plates 45 and 46, with a surrounding tubular flow channel 48 of rectangular section. The lower portion of the fuel assembly is provided with a nose 50 having openings 52 through which coolant water is received to flow upwardly past fuel rods 42 within flow channel 48. Nose 50 is configured to mate with correspondingly configured sockets (not shown) within fuel assembly supports 20.

As is well known, each fuel rod may be formed of a cylindrical cladding tube containing a plurality of sintered pellets of enriched uranium and/or plutonium oxide fuel. The enrichment varies from rod to rod over a fuel assembly, typically over a range of approximately 0.7-5.0 w/o (weight percent fissile) to provide an average of approximately 1.5-3.5 w/o (naturally occurring uranium has 0.7 w/o). The fuel rods may be approximately one-half inch in diameter and approximately 12 to 15 feet long.

Figure 4:
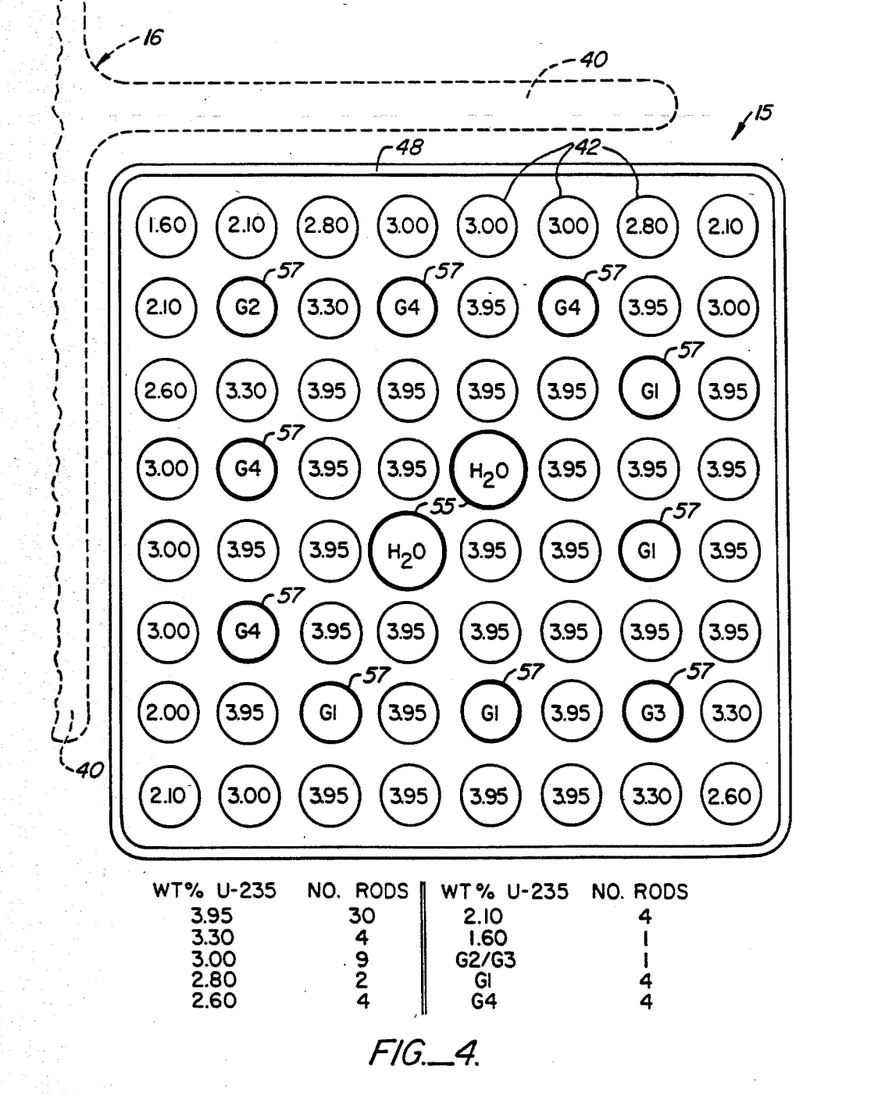
FIG. 4 is a transverse schematic view of a fuel assembly according to the present invention.

FIG. 4 is a schematic view illustrating the transverse (horizontal) distribution of the fuel rods in a typical reload fuel assembly according to the invention. Fuel rods 42 are arranged in an 8×8 matrix with two of the central fuel rod locations being occupied by water channels 55 (sometimes called "water rods"). Ten of the fuel rods, designated with a reference numeral 57, contain burnable absorber in the form of gadolinia, and are depicted by a circle with a code (G1, G2, G3, or G4) inside. The remaining fifty-two fuel rods are gadolinia-free and are depicted by a circle with a number inside representing the weight percentage of U-235, in this case, in the range of 1.60-3.95 w/o. The variation of enrichment over the transverse extent of fuel assembly 15 and the particular locations of gadolinia-containing rods 57 are dictated by well-known considerations which will not be discussed in detail since they are not part of the present invention.

The particular configuration of the G1, G2, G3, and G4 rods determines the axial power shaping and cold shutdown control characteristics of the fuel assembly. Various embodiments will be described below. FIGS. 5A-G illustrate the composition of seven fuel assembly embodiments while FIGS. 6A-G show the composition of the gadolinia-containing fuel rods of these seven embodiments. It should be remembered that the fuel assembly may be provided with a relative enhancement of gadolinia in a given axial zone by increasing the number of gadolinia-containing rods within that zone, or increasing the gadolinia concentration within a fixed number of rods in the zone. At the concentrations utilized in the present invention (2-5 w/o), all the gadolinia is self-shielded.

Figure 5A:
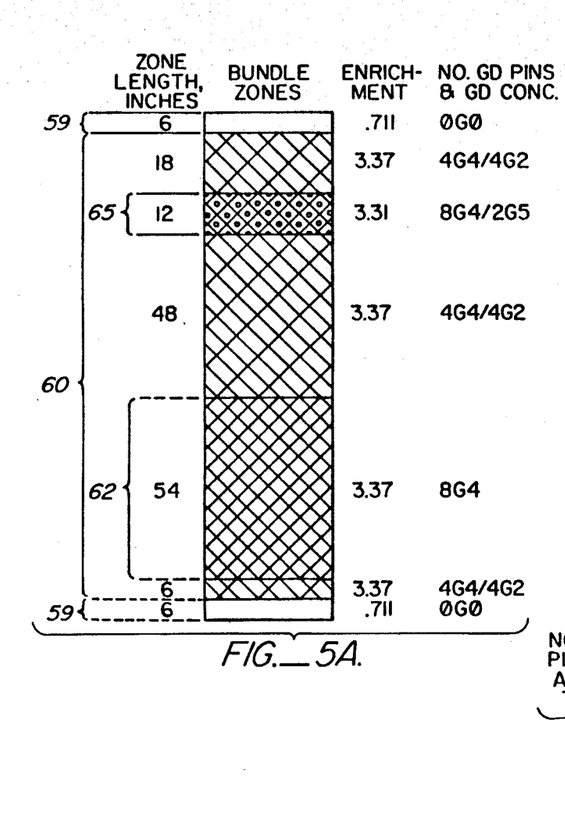
FIGS. 5A-H show the longitudinal composition of various embodiments of fuel assemblies according to the present invention.

FIG. 5A is a schematic illustrating the longitudinal composition of a first embodiment of a fuel assembly according to the present invention. It will be noted that the fuel assembly has an axial dimension of 12.5 feet (150 inches) which includes 6-inch natural uranium blankets 59 at top and bottom, and an 11.5-foot enriched section 60. The uranium blankets will not be further discussed, and the remaining description will be in terms of enriched section 60.

Figure 6A:
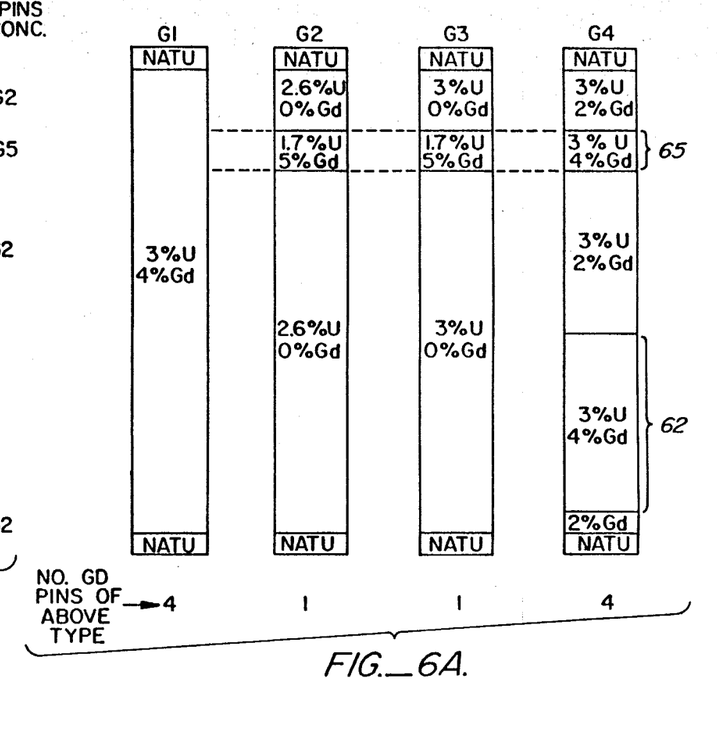

The fuel assembly includes a gadolinia component, provided by the gadolinia-containing rods, which has two purposes, namely axial power shaping in the hot operating state, and control of cold shutdown reactivity. To this end, the fuel assembly has enhanced gadolinia in a substantial zone 62, designated the "hot operating control zone," and in a relatively short zone 65, designated the "cold shutdown control zone." Zone 62 is at or near the bottom of enriched section 60 while zone 65 is near the top. In this particular embodiment, zones 62 and 65 have respective lengths of 54 inches and 12 inches. Thus the cold shutdown control zone 65 of the embodiment of FIGS. 5A/6A extends from 114–126 inches or from 76–84 percent of the 150 inch total height of the fuel in the fuel assembly. The enhancement in zone 62 is provided by increased gadolina concentration while that in zone 65 is provided both by increased gadolinia concentration and by a greater number of gadolinia-containing rods.

FIG. 6A illustrates the longitudinal composition of the gadolinia-containing fuel rods. The G1 and G4 rods include a component of gadolinia distributed over the entirety of enriched section 60, with the G4 rods having enhanced gadolinia concentration in hot operating control zone 62 (4 w/o as opposed to 2 w/o). The G4 rods also have enhanced gadolinia concentration (4 w/o) in cold shutdown control zone 65, with additional gadolinia enhancement in cold shutdown control zone being provided by the G2 and G3 fuel rods which contain a relatively high concentration of gadolinia (5 w/o) in zone 65 only. It is noted parenthetically that the G2 and G3 fuel rods are characterized by a somewhat reduced uranium enrichment in cold shutdown control zone 65. Although significantly reduced enrichment in this zone is a characteristic of some of the embodiments to be described below, the reduced enrichment in the G2 and the G3 rods alone leads to a small average reduction over the fuel assembly. The only significance for this embodiment is that it is advantageous to fabricate fuel pellets having standard predetermined gadolinia and U-235 concentrations.

The enhanced gadolinia content in cold shutdown control zone 65 permits reduction of the gadolinia content in the zones outside zones 65 and 62 to achieve the desired axial power shaping. Prior art without zone 65 would have required increasing the gadolinia content in zone 62 to achieve axial power shaping. Furthermore, under prior art, any needs for increased cold shutdown margin would have required increased gadolinia loading in all axial zones to maintain the axial power shaping.

Figures 5B, 6B:
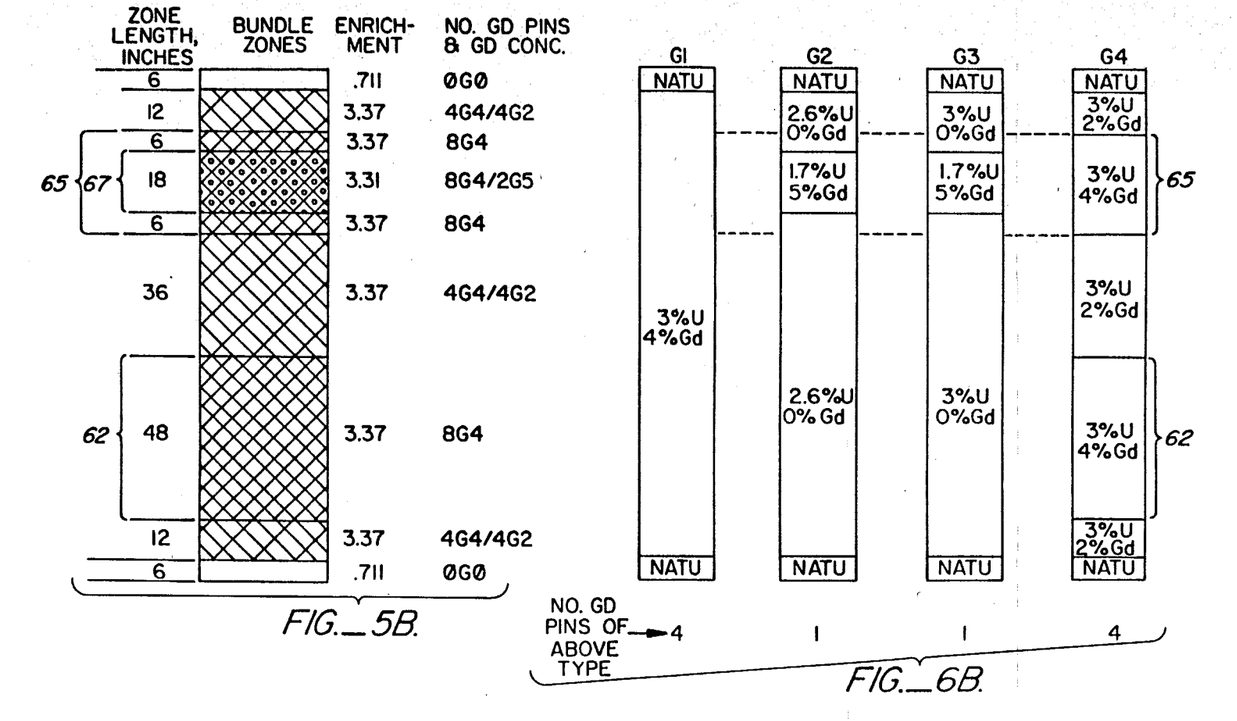
FIGS. 6A-H show the longitudinal composition of the gadolinia-containing fuel rods in the fuel assemblies of FIGS. 5A-G.

FIG. 5B is a schematic illustrating the longitudinal composition of a second embodiment of a fuel assembly according to the present invention. This embodiment differs from the embodiment of FIG. 5A in that the hot operating control zone is slightly shorter (48 inches) while the cold shutdown control zone is longer (30 inches), the cold shutdown control zone of this embodiment extending from 102–132 inches or from 68–88 percent of the height of the fuel. It is also noted that the gadolinia component in the cold shutdown control zone is not uniform, but rather has a stepped distribution with a central portion 67 having maximum enhancement. FIG. 6B illustrates the longitudinal composition of the gadolinia-containing rods. It can be seen that the shaping of the gadolinia distribution in the cold shutdown control zone is provided by the G2 and G3 rods having a relatively shorter enhanced section than that of the G4 rods.

Figure 5C:
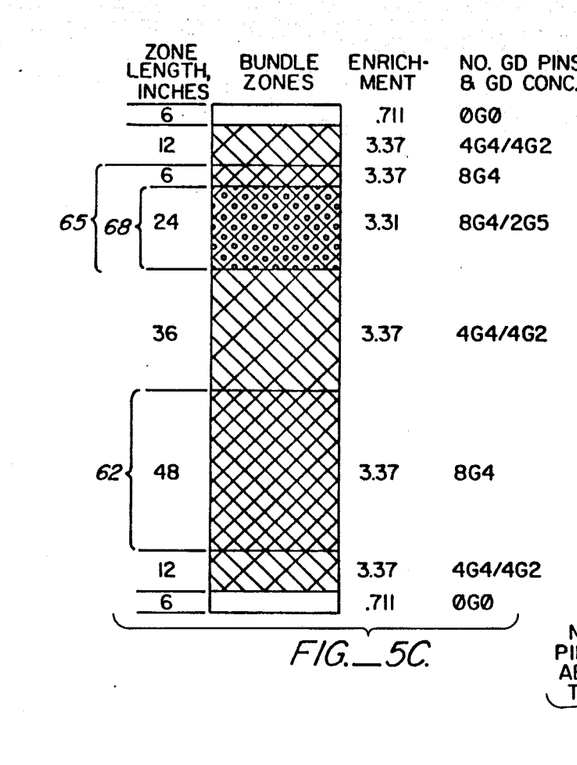
Figure 6C:
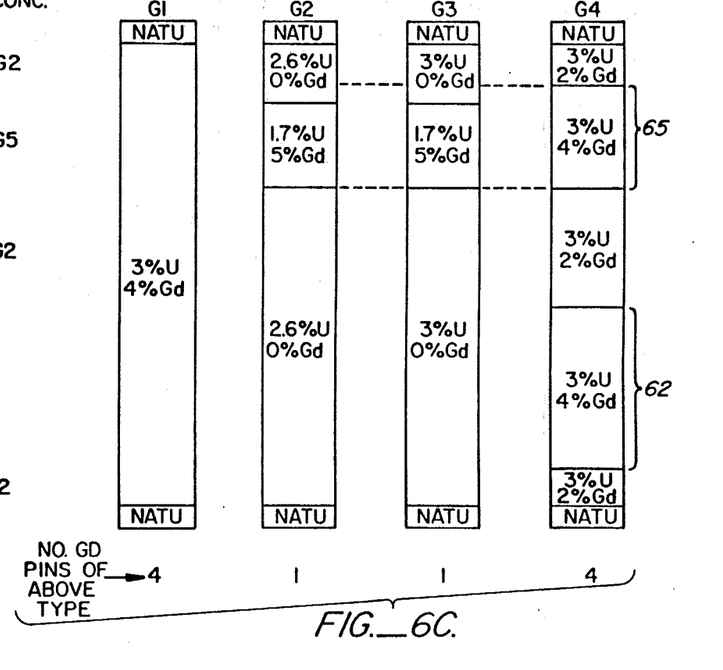

FIG. 5C is a schematic illustrating the longitudinal composition of a third embodiment of a fuel assembly according to the present invention. This embodiment differs from that of FIG. 5B in that cold shutdown control zone 65, while also of stepped construction and extending from 102–132 inches or from 68–88 percent of the height of the fuel, has a longer section 68 of maximum gadolinia enhancement. Referring to FIG. 6C which illustrates the longitudinal compositions of the gadolinia-containing fuel rods, it can be seen that the enhanced gadolinia segment of the G2 and G3 fuel rods is longer than that in the embodiment of FIGS. 5B and 6B, thus accounting for the difference in the length of section 68.

Figure 5D:
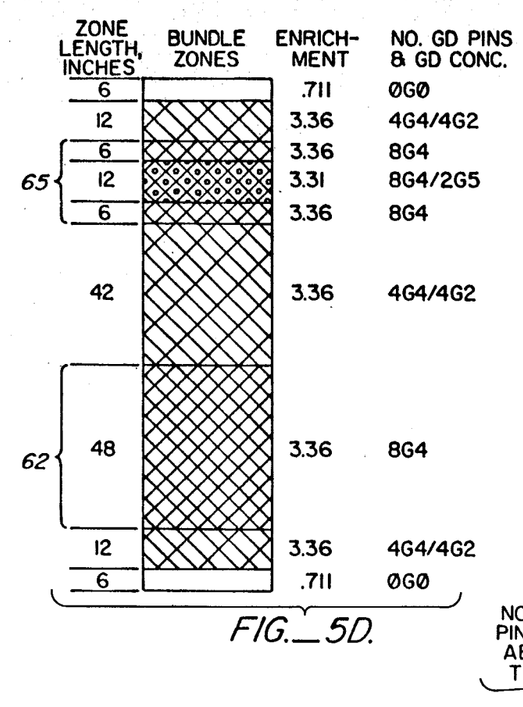
Figure 6D:
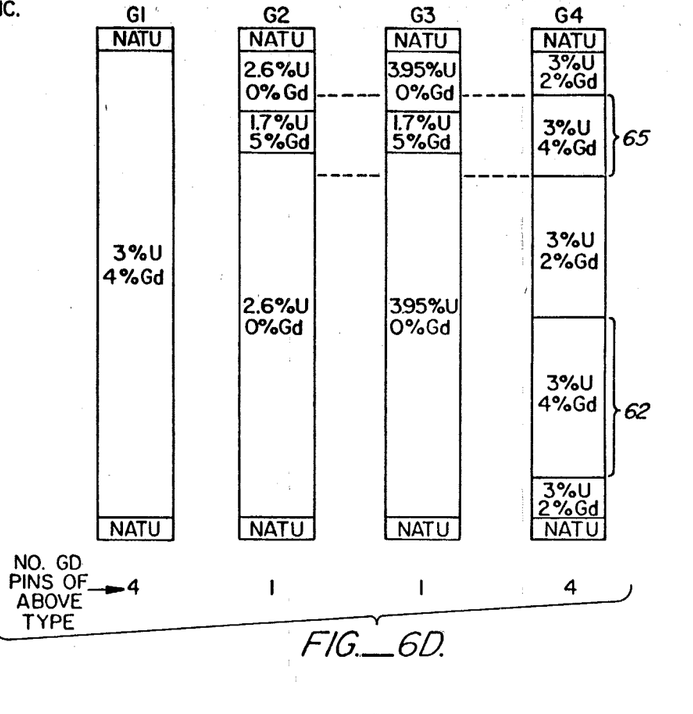

FIG. 5D is a schematic illustrating the longitudinal composition of a fourth embodiment of a fuel assembly according to the present invention. This embodiment most closely resembles that of FIG. 5B, but is characterized by a somewhat shorter central section of the cold shutdown control zone, the cold shutdown control zone 65 extending from 108–132 inches or from 72–88 percent of the height of the fuel. FIG. 6D is a schematic illustrating the longitudinal composition of the gadolinia-containing fuel rods.

Figure 5E:
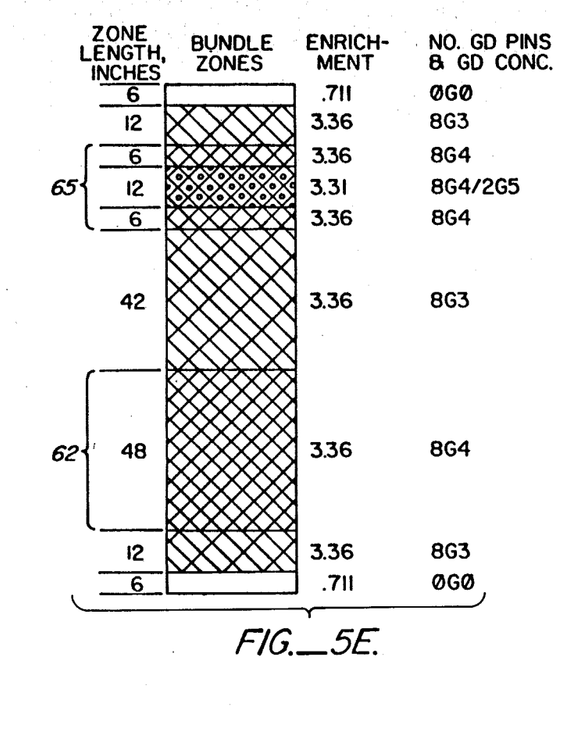
Figure 6E:
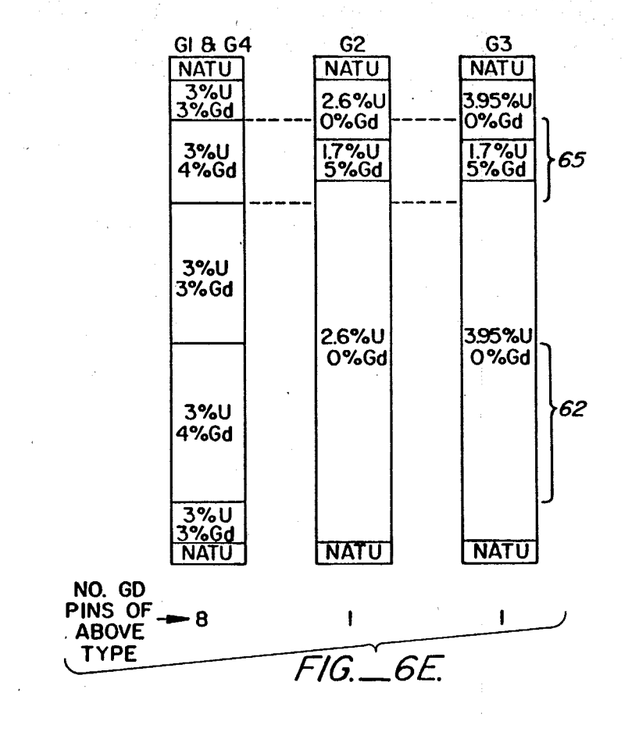

FIG. 5E is a schematic illustrating the longitudinal composition of a fifth embodiment of fuel assembly according to the present invention This embodiment most closely resembles that of FIG. 5D, the cold shutdonw control zone 65 extending from 108–132 inches or from 72–88 percent of the height of the fuel but is characterized by a somewhat different gadolinia distribution outside control zones 62 and 65. More particularly, while the embodiments of FIGS. 5A–D are characterized by eight gadolinia-containing rods outside the control zone, four of which have a gadolinia concentration of 4 w/o and four of which have a gadolinia concentration of 2 w/o, the fifth embodiment comprises eight identical rods having a gadolinia concentration of 3 w/o. Thus, while the absolute gadolinia content is the same, the burnup and manufacturing characteristics are different. FIG. 6E is a schematic illustrating the longitudinal composition of the gadolinia-containing fuel rods.

Figure 5F:
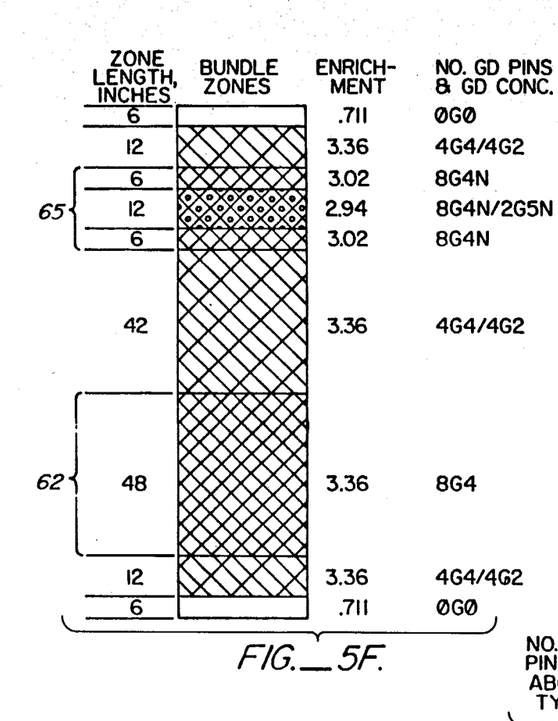
Figure 6F:
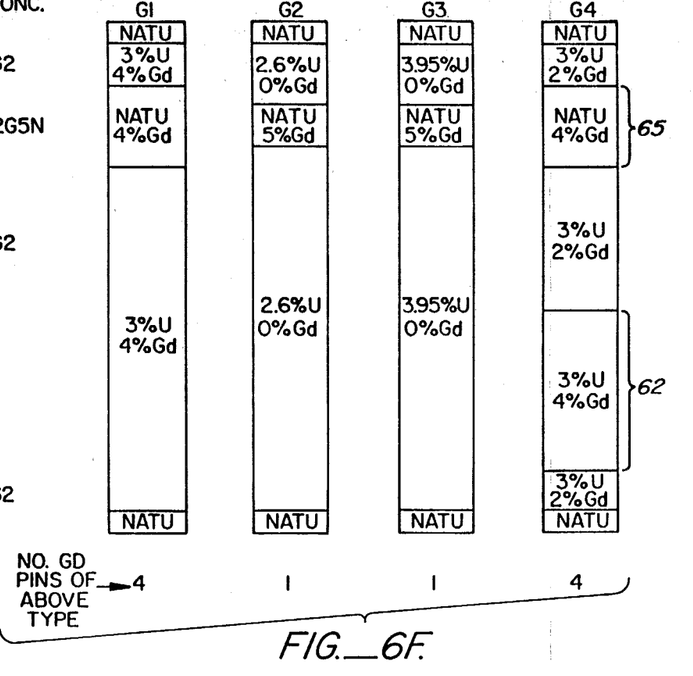

FIG. 5F is a schematic illustrating the longitudinal composition of a sixth embodiment of a fuel assembly according to the present invention. This embodiment has the same zone, sizes and gadolinia distribution as the embodiment of FIG. 5D. However, this embodiment differs in that the enrichment in cold shutdown control zone 65 is substantially reduced relative to the enrichment outside in the control zone. Referring to FIG. 6F which shows the longitudinal composition of the gadolinia-containing fuel rods, it can be seen that this reduction in enrichment may be provided by having natural uranium in the enhanced gadolinia sections of the G1, G2, G3, and G4 fuel rods. The reduction of enrichment is not uniform, but is stepped in a manner similar to that in which the gadolinia enhancement is stepped.

Figure 5G:
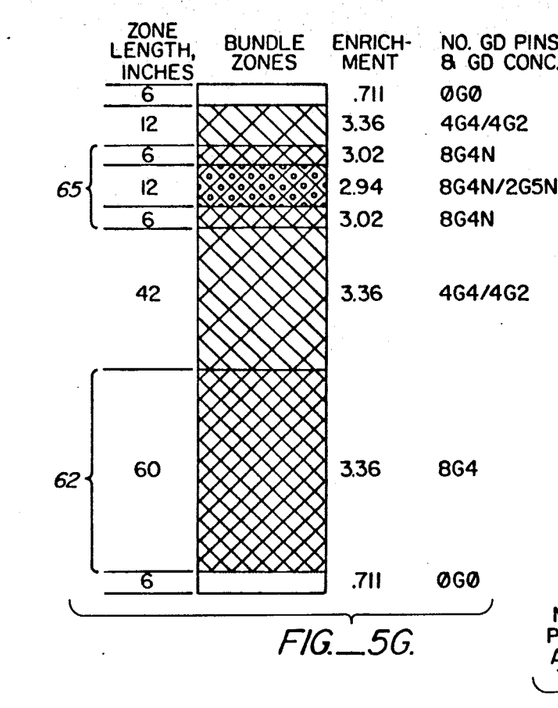
Figure 6G:
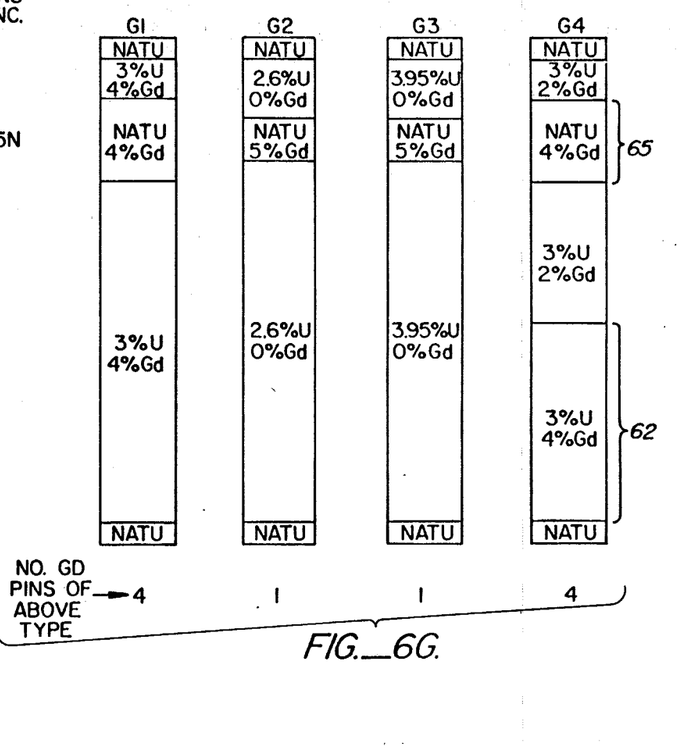

FIG. 5G is a schematic illustrating the longitudinal composition of a seventh embodiment of a fuel assembly according to the present invention. This embodiment differs from that of FIG. 5F only in that the length of hot operating control zone 62 is slightly longer. This difference is achieved by corresponding reconfiguration of the G4 rods, as can be seen in FIG. 6G.

Figure 5H:
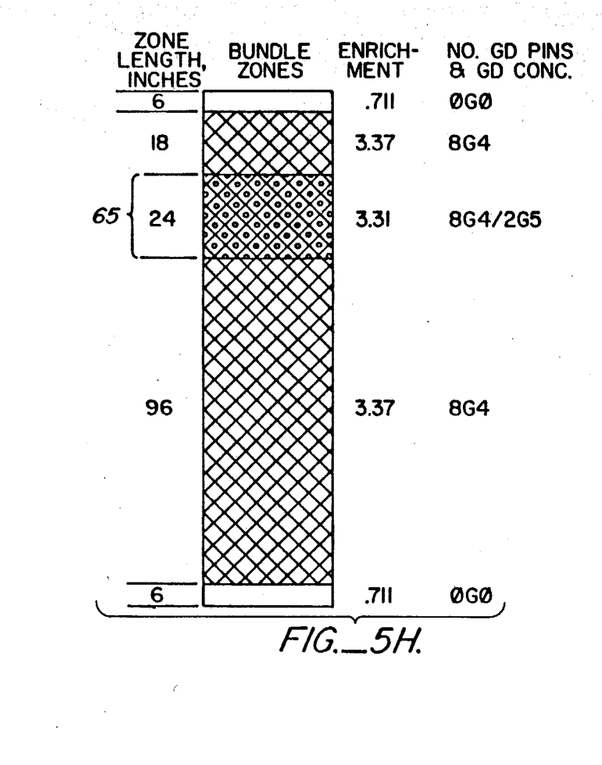
Figure 6H:
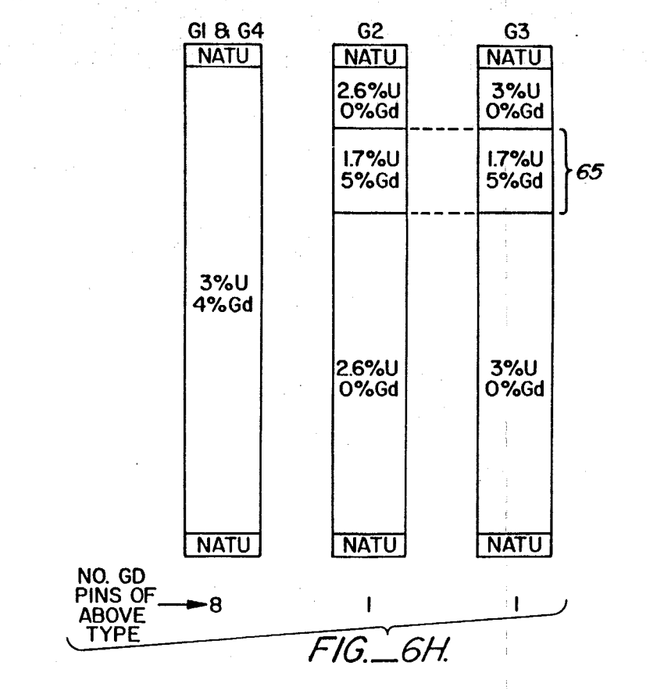

While the embodiments described above are characterized by a gadolinia distribution having an enhancement in hot operating control zone 62 to provide axial power shaping, it is not necessary that the cold shutdown control provided by the present invention be coupled with axial power shaping. FIG. 5H is a schematic illustrating the longitudinal composition of an eighth embodiment of a fuel assembly according to the present invention. This embodiment differs from the above-described seven embodiments in that the gadolinia distribution is uniform except for an enhancement in cold shutdown control zone 65, which extends from 102–126 inches or from 68—84 percent of the height of the fuel. Referring to FIG. 6H which shows the longitudinal composition of the gadolinia-containing fuel rods, it can be seen that the G1 and G4 fuel rods have a uniform gadolinia component while the enhancement in zone 65 is provided by the G2 and G3 fuel rods. It is noted that this embodiment differs from the embodiment of FIGS. 5C and 6C only in the manner in which the G4 fuel rods are configured.

Figure 7A:
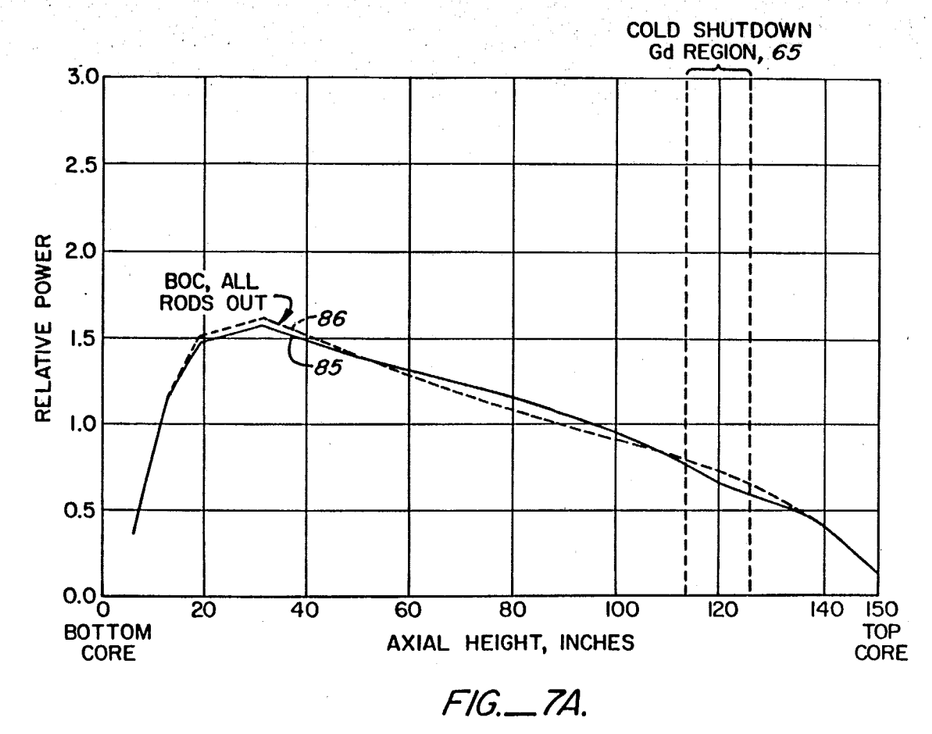
FIG. 7A is a plot of relative power for a reactor in the hot operating state.

It is apparent that the effect of the enhanced gadolinia in cold shutdown control zone 65, which extends over a range of from 68–88 percent of the height of the fuel of the fuel assembly, will be different for the various embodiments, and will also vary, depending on the operating history of the reactor. FIG. 7A shows a plot 85 of relative power as a function of axial position for a reactor having a core comprising fuel assemblies of the type illustrated in FIGS. 5A and 6A and operated at BOC (beginning of cycle) with alll control rods out. The plot is normalized to unit average power. For purposes of comparison, FIG. 7A also includes a corresponding plot 86, drawn in phantom, of the axial power distribution for a core characterized by uniform gadolinia distribution. It can be seen that the gadolinia enhancement in the hot operating control zone has the effect of rendering somewhat more uniform the axial power distribution while the effect of the gadolinia enhancement in the cold shutdown control zone results in a small reduction in this zone.

Figure 7B:
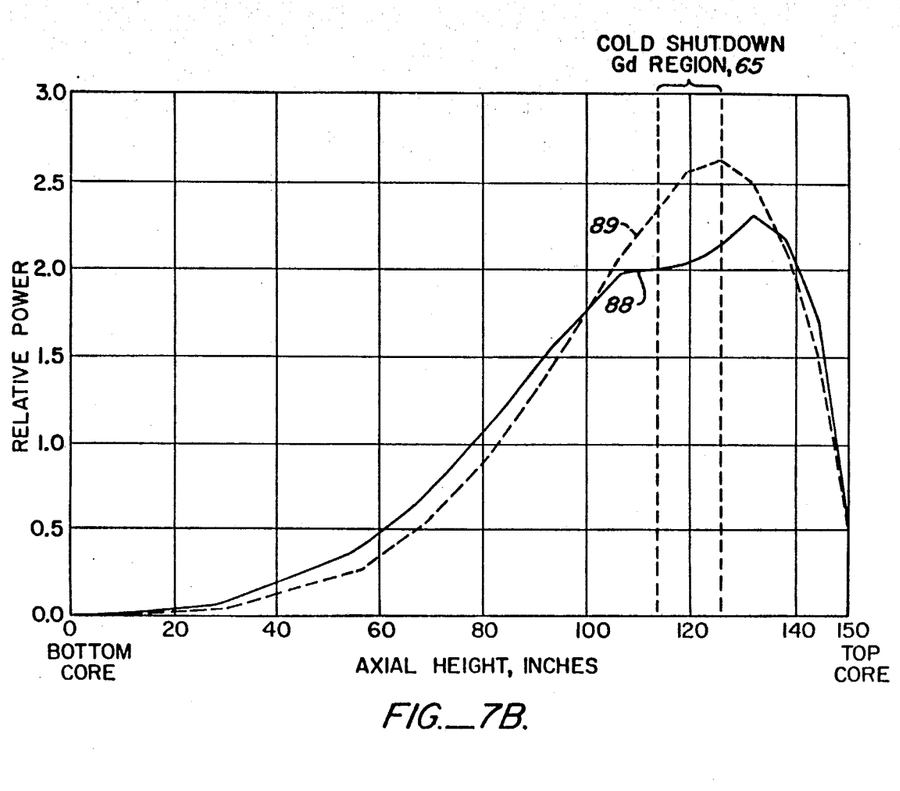
FIG. 7B is a plot of relative power for a reactor in the cold shutdown state with one control rod out.

FIG. 7B shows a plot 88 of relative power as a function of axial position for a reactor core in the cold shutdown condition at BOC with all control rods except one in. Again, the plot is normalized for unit average power, and the figure further shows a corresponding plot 89, drawn in phantom, of the power distribution for a core having an axially uniform gadolinia component. It should be noted that the absolute neutron fluxes for FIG. 7B are generally about 7 orders of magnitude lower than those of FIG. 8A ($10^6$ neutrons/cm$^2$/sec cold as opposed to $10^{13}$ neutrons/cm$^2$sec hot). The effect of the gadolinia enhancement in the cold shutdown control zone manifests itself as a dramatic decrease in neutron flux and power in cold shutdown zone 65.

The choice of fuel assembly embodiment will depend on the particular needs of the utility operating the nuclear plant, since the mode of operation will strongly influence the particular cold shutdown requirements. Some utilities require a high capacity factor and at the same time have to adhere to a rigid timetable that may require early shutdown with excess reactivity. For example, such time constraints may be imposed by regulations governing inspection intervals, or by the seasonal availability of alternate power sources such as hydroelectric. In such a case, where the most limiting situation is toward the beginning of cycle, sufficient cold shutdown control is maintained by providing a longer cold shutdown control zone or a larger number of gadolinia-containing fuel rods. A reduction in uranium enrichment in the cold shutdown control zone is an appropriate technique under these circumstances. It is noted that reducing the enrichment has a generally uniform effect throughout the cycle while the gadolinia worth varies over the cycle. On the other hand, some utilities tend to operate over a long cycle. This mode of operation may be dictated in a situation where the cost of alternate power is always high, so that replacement power costs dominate the fuel cycle cost. In such a case, it is appropriate to increase the concentration of gadolinia in the cold shutdown control zone to maintain sufficient gadolinia worth in mid-cycle and near the end of the cycle.

In summary it can be seen that the present invention provides a fuel assembly configuration characterized by increased cold shutdown margins and the capability to adjust cold shutdown margins while having a small effect on burnable absorber residual reactivity penalty and on axial power shaping. The cold shutdown and axial power shaping requirements are both met in a coupled, optimal manner through embodiments that are made possible by the present invention. Consideration of the above-described embodiments quickly demonstrates the flexibility of the present invention wherein fuel assemblies suitable for a wide variety of operating conditions may be achieved by reconfiguring only the gadolinia-containing fuel rods, and not even necessarily all of them.

While the above provides a full and complete description of the preferred embodiments of the present invention, various modifications, alternate constructions, and equivalents may be employed without departing from the true spirit and scope of the invention. For example, while those embodiments having enhanced gadolinia and reduced enrichment in the cold shutdown control zone show the enhancement and reduction as being coextensive, there is no absolute requirement that this be so. Thus, the gadolinia enhancement could extend over a first part of the zone and the enrichment reduction over a second part, possibly overlapping the first part. Additionally, while the transverse distribution of the gadolinia-containing fuel rods as shown is appropriate for a reload fuel assembly, the configuration would typically be different for initial load fuel assemblies. Moreover while it is convenient to minimize the number of "special" rods characterized by gadolinia content and reduced enrichment by confining these properties to a small subset of rods, there is no absolute requirement that this be done. Thus, it is possible to have a first subset of rods having a gadolinia enhancement in the cold shutdown control zone and a second subset of rods having reduced enrichment in the cold shutdown control zone. Therefore, the description and illustration should not be construed as limiting the scope of the invention which is defined by the appended claims.

We claim:

1. In a boiling water reactor core whose operation is characterized by a substantial proportion of steam voids with concomitantly reduced moderation toward the top of said core when said reactor is in its hot operating condition, said reduced moderation leading to slower burnup and greater conversion ratio in an upper core region so that when said reactor is in its cold shut down condition the resulting relatively increased moderation in said upper core region is accompanied by a reactivity profile that peaks in said upper core region, a fuel assembly comprising:

a component of fissile material distributed over a substantial axial extent of said fuel assembly; and a component of neutron absorbing material having an axial distribution characterized by an enhancement in an axial zone of said fuel assembly, designated the cold shutdown control zone, corresponding to at least a portion of the axial region of said core when the cold shutdown reactivity peaks, the aggregate amount of neutron absorbing material in said cold shutdown zone of said fuel assembly being greater than the aggregate amount of neutron absorbing material in the axial zones of said fuel assembly immediately above and immediately below said cold shutdown control zone whereby the cold shutdown reactivity peak is reduced relative to the cold shutdown reactivity in said zones immediately above and immediately below said cold shutdown control zone, said cold shutdown zone having an axial extent measured from the bottom of the fuel assembly in the range between 68–88 percent of the height of said fissile material in said fuel assembly.

2. The invention of claim 1 wherein said enhancement in said cold shutdown control zone is provided at least in part by a relatively increased number of transversely distributed regions containing burnable absorber.

3. The invention of claim 1 wherein said enhancement in said cold shutdown control zone is provided at least in part by relatively increased concentration of absorber in a fixed number of transversely distributed regions containing burnable absorber.

4. The invention of claim 1 wherein said component of fissile material is distributed in a generally axially homogeneous manner.

5. The invention of claim 1 wherein said component of fissile material has an axial distribution characterized by relatively reduced enrichment in said cold shutdown control zone.

6. The invention of claim 1 wherein the axial distribution of said component of neutron absorbing material includes portions over substantially the entire axial extent of said fissile material.

7. The invention of claim 1 wherein the axial distribution of said component of neutron absorbing material is characterized by an additional enhancement in an axial zone corresponding to at least a portion of the axial region where the hot operating reactivity is maximum.

8. The invention of claim 1 wherein said component of fissile material has an axial extent of approximately 10–15 feet and wherein said cold shutdown control zone has an axial extent of about 0.5–3 feet.

9. The invention of claim 1 wherein said cold shutdown control zone has an axial extent measured from the bottom of the fuel assembly in the range between 68–88 percent of the height of said fissile material of said fuel assembly.

10. The invention of claim 1 wherein said cold shutdown control zone has an axial extent of from 72–88 percent of the height of said fissile material of said fuel assembly.

11. The invention of claim 1 wherein said cold shutdown control zone has an axial extent of from 76–84 percent of the height of said fissile material of said fuel assembly.

12. The invention of claim 1 wherein said neutron absorbing material is a burnable absorber.

13. The invention of claim 12 wherein said burnable absorber comprises gadolinium.

14. The invention of claim 1 wherein said fuel assembly comprises a plurality of generally parallel and spatially separated fuel rods, a first subset of said fuel rods having enhanced neutron absorbing material in said cold shutdown control zone to provide said enhancement, a second subset of said fuel rods being devoid of neutron absorbing material enhancement in said cold shutdown control zone.

15. The invention of claim 14 wherein at least some of the fuel rods within said second subset are substantially devoid of neutron absorbing material.

16. The invention of claim 14 wherein at least some of the fuel rods in said first subset include neutron absorbing material over an axial range beyond said cold shutdown control zone.

17. The invention of claim 14 wherein at least some of the fuel rods in siad first subset include neutron absorbing material in said cold shutdown control zone only.

* * * * *